United States Patent [19]

Tellert

[11] 4,270,414

[45] Jun. 2, 1981

[54] IGNITION CONTROL FOR BETTER GEAR SHIFTING IN AN AUTOMOTIVE VEHICLE

[75] Inventor: Rudy Tellert, Schweinfurt, Fed. Rep. of Germany

[73] Assignee: Sachs-Systemtechnik GmbH, Schweinfurt, Fed. Rep. of Germany

[21] Appl. No.: 943,682

[22] Filed: Sep. 19, 1978

[30] Foreign Application Priority Data

Sep. 23, 1977 [DE] Fed. Rep. of Germany ....... 2742809

[51] Int. Cl.³ .................... F02B 77/00; B60K 41/08; F02D 11/02
[52] U.S. Cl. ....................................... 74/852; 74/851; 74/879; 74/474; 123/198 DC; 200/61.88
[58] Field of Search ................ 74/851, 852, 853, 856, 74/879, 474, 478, 878; 123/198 DC, 198 F, 118; 200/61.88; 192/0.08, 0.084

[56] References Cited

U.S. PATENT DOCUMENTS

| 2,231,876 | 2/1941 | Beltz | 74/852 |
|---|---|---|---|
| 2,257,838 | 10/1941 | Claytor | 74/852 X |
| 2,293,409 | 8/1942 | Smith | 74/478 |
| 2,387,891 | 10/1945 | Elkin | 74/851 |
| 2,387,911 | 10/1945 | Kearney | 74/852 |
| 2,519,080 | 8/1950 | Simpson | 74/851 X |
| 2,672,763 | 3/1954 | Limon et al. | 74/851 |
| 2,741,350 | 4/1956 | Dodge | 74/851 X |
| 2,765,670 | 10/1956 | Winkler | 123/198 DC |
| 3,327,553 | 6/1967 | Peras | 74/858 |
| 3,481,223 | 12/1969 | Fraser | 74/851 |
| 3,792,630 | 2/1974 | Hause | 74/851 X |
| 3,884,203 | 5/1975 | Cliffgard | 123/198 DC |
| 3,964,461 | 6/1976 | Wesemeyer | 123/198 DC |
| 4,061,051 | 12/1977 | Grondis | 74/478 |
| 4,073,279 | 2/1978 | Fox | 123/198 DC |
| 4,074,672 | 2/1978 | LaDue et al. | 123/198 DC |
| 4,144,424 | 3/1979 | Takeda et al. | 200/61.88 |

FOREIGN PATENT DOCUMENTS

| 871674 | 3/1953 | Fed. Rep. of Germany | 74/851 |
|---|---|---|---|
| 1655633 | 2/1971 | Fed. Rep. of Germany | 200/61.88 |
| 1338647 | 8/1963 | France | 74/851 |
| 435413 | 9/1935 | United Kingdom | 74/478 |
| 799454 | 8/1958 | United Kingdom | 200/61.88 |
| 965343 | 7/1964 | United Kingdom | 200/61.88 |

Primary Examiner—Leslie Braun
Attorney, Agent, or Firm—Toren, McGeady and Stanger

[57] ABSTRACT

Gear shifting in an automotive vehicle with internal combustion engine, particularly a motorcycle, is facilitated by a mechanism which automatically inactivates the ignition circuit in response to operation of a speed or gear shifting member, and again activates the ignition circuit with a predetermined delay after inactivating.

12 Claims, 5 Drawing Figures

IGNITION CONTROL FOR BETTER GEAR SHIFTING IN AN AUTOMOTIVE VEHICLE

This invention relates to an improvement in apparatus for supplying motive power to a vehicle, and particularly to a mechanism for facilitating the shifting of the transmission ratio in a variable speed transmission coupled to an internal combustion engine of the vehicle which is equipped with an external ignition circuit.

The invention will be described hereinafter in connection with a motorcycle in which it has found its most valuable application so far, but other applications will suggest themselves to those skilled in the art.

Depending on engine power, terrain, and other conditions, the transmission ratio of the variable rate transmission in a motorcycle must be changed more or less frequently. Engine power is most effective only in a relatively narrow range of rotary speeds, and frequent gear shifting is particularly necessary when highest performance is desired, as in racing. It is accepted practice to reduce engine torque during gear shifting to reduce the load on the gears in the speed shifting transmission, particularly when the clutch is not to be disengaged. This is achieved in conventionally equipped motorcycles by turning the handle bar grip which throttles the fuel supply. Turning the grip significantly reduces the driver's control over the motorcycle.

It is a primary object of the invention to provide an automatic device for reducing engine output during gear shifting, that is, during each change in the transmission ratio of the multiple-speed transmission coupled to the internal-combustion engine of an automotive vehicle. As mentioned above, the invention has been found particularly advantageous in a motorcycle, but it is applicable to any vehicle whose internal-combustion engine is equipped with an external ignition circuit.

According to the invention, the ignition circuit of such an engine is inactivated in response to operation of a speed-shifting or gear-shifting member operatively connected to the variable speed transmission for changing the transmission ratio of the latter. A timing device is provided and again activates the ignition circuit a fraction of a second after the inactivating. The output of the engine is cut at least as effectively by inactivating the ignition circuit as by throttling the fuel supply, and full engine power can be restored more precisely and quickly by an automatic timing device than by the driver's hand.

Other features, additional objects, and many of the attendant advantages of this invention will readily be appreciated as the same becomes better understood from the following detailed description of preferred embodiments when considered with the appended drawing in which.

Figure 1:
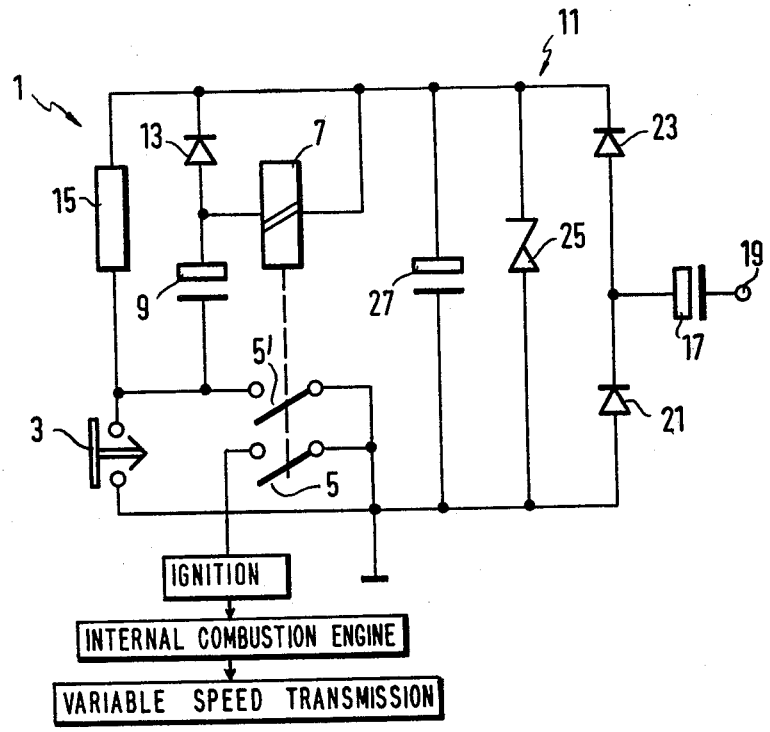
FIG. 1 is a circuit diagram of an electromechanical inactivating and timing mechanism of the invention.

Referring now to the drawing in detail, and initially to FIG. 1, there is shown an inactivating and timing circuit 1 including a normally open, single-pole switch 3. When the switch 3 is closed, it connects a D.C. power supply 11 to the coil 7 of a relay and a capacitor 9 arranged in series circuit. The relay attracts its armature and thereby closes normally open contacts 5, 5'. The contacts 5' provide a holding circuit by-passing the switch 3 and maintaining current supply to the capacitor 9 and coil 7 when the switch 3 is opened. The closed contacts 5 short-circuit the primary winding of the ignition coil or another part of the ignition circuit of the motorcycle, not otherwise shown in FIG. 1, to ground, thereby cutting engine power. A diode 13 shunted across the coil 7 limits inductive voltage peaks in the coil. The coil 7 is deenergized when the capacitor 9 is fully charged.

The charging time is determined by the characteristics of the capacitor 9 jointly with the chracteristics of the coil 7 and is preferably chosen to keep the coil 7 energized, and the ignition inactivated for approximately 0.1–0.2 seconds. A bleeder resistor 15 is shunted across the series circuit of the coil 7 and capacitor 9 and selected to discharge the capacitor in a period somewhat longer than the charging period, but still short enough to permit discharge of the capacitor 9 between two gear shifting operations which cause the switch 3 to be closed, as will presently be described.

The power supply 11 for the circuit 1 includes a voltage doubler circuit including series connected diodes 21, 23 whose junction is connected to a source 19 of alternating current, such as the alternator of a motorcycle, through a capacitor 17. A Zener diode 25 and a capacitor 27 are each arranged in parallel to the series connected diodes to stabilize the output. The polarities of the diodes are selected so that the coil 7 receives a positive voltage and the switch 3, the contacts 5, 5', and negative terminal of the power supply 11 are grounded.

Figure 2:
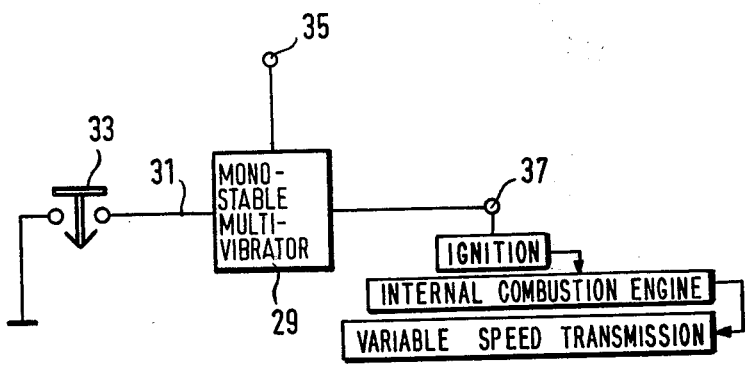
FIG. 2 shows an electronic mechanism of the invention in the manner of FIG. 1.

FIG. 2 shows a monostable multivibrator 29 energized with direct current from a power supply 35, not shown in detail. The multivibrator normally supplies current to a terminal 37 of the ignition system, not otherwise shown. A trigger input terminal 31 of the multivibrator 29 may be grounded by a normally open switch 33 when the switch is operated automatically during a shifting of the motorcycle transmission, as will presently be described, and causes the multivibrator to interrupt the current supply to the ignition circuit for a period determined by the time constant of the multivibrator.

The circuitry of FIGS. 1 and 2 is readily installed on a motorcycle and responds to gear shifting as will be described with reference to FIGS. 3 to 5.

Figure 3:
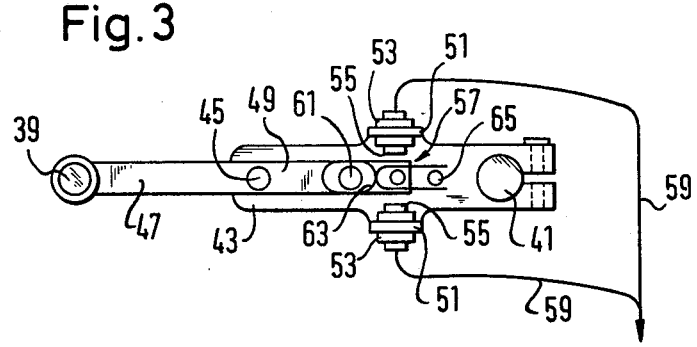
FIG. 3 shows external elements of a gear shifting mechanism of a motorcycle adapted for triggering the mechanisms of FIGS. 1 and 2 in side elevation.

FIG. 3 shows only as much of the mechanical elements of a motorcycle as is needed for an understanding of this invention. A gear shifting pedal 39 permits a gear shift lever shaft 41 to be turned clockwise and counterclockwise as is conventional in itself, to change the transmission ratio of the transmission, not otherwise shown. A radial arm 43 fixedly fastened on the end of the shaft 41 carries a pivot pin 45 on its free end. A two-armed lever 47 is fulcrumed on the pin 45, and its arm remote from the shaft 41 carries the pedal 39. The other arm 49 is limited in its angular movement between two brackets 51 on the arm 43 in which insulating bushings 53 hold respective switches 57. Their actuator members 55 are located in the path of angular movement of the lever arm 49 which is biased toward a centered position spacedly intermediate the actuator members 55 by a hair-pin shaped spring 63 mounted between a stud 61 and an abutment pin 65.

The switches 57 are normally-open, single-pole switches functionally equivalent to the switch 3 shown in FIG. 1 and the switch 33 illustrated in FIG. 2. One contact of each switch 57 is grounded, and the other contact is connected to circuitry of the type shown in FIG. 1 or 2 by a lead 59. If the pedal 39 is moved up or down to cause a change in the transmission ratio of the gear transmission represented only by the shaft 41 in FIG. 3, one of the switches 57 is closed, and the ignition to the non-illustrated engine is cut for a fraction of a second.

If the switches 57 are arranged in parallel in the circuitry of FIG. 1 to replace the switch 3, the ignition circuit is short-circuited to ground during the brief period necessary for shifting gears under virtual no-load conditions. If the switches are similarly arranged at 33 in the circuit of FIG. 2, they cause the ignition circuit to be interrupted for an equally brief period with substantially the same effect. In either case, the ignition circuit is activated again more quickly than would be possible by manual control.

The contacts 57 directly connected to the ignition circuit are located outside the transmission casing and require careful shielding from contaminants. They are better protected if arranged within the transmission casing 66 as is shown in FIGS. 4 and 5. The gear shift lever shaft 67 projects outward from the casing, and its knurled outer end carries a radial arm and a gear shift pedal in the conventional manner partly evident from FIG. 3. An arm 69 has an annular end fixedly fastened to the shaft 67 in the casing 66, and its radially outer end is formed with a circumferentially elongated slot 79.

Another radially elongated arm 71 is pivotally mounted on the shaft 67 by means of a pin 75 on the arm 71 being received in a blind, coaxial bore 73 of the shaft, the arms 69, 71 being axially closely adjacent in the assembled condition of the device. An axial pin 77 on the arm 71 is received in the slot 79 and projects beyond the arm 69. Brackets 87 near the shaft 67 on the face of the arm 69 remote from the arm 71 carry two leaf springs 85 which converge toward the pin 77 so as to bias the pin toward the center of the slot 79. More rigid leaf springs 83 are mounted on the brackets 87 spacedly parallel to the springs 85 and are insulated from the brackets 87 in a conventional manner, not shown. Contact pads 81 on the free ends of the two springs 83 and the opposite face portions of the leaf springs 85 constitute two switches which are open in the illustrated position of the device.

Figure 4:
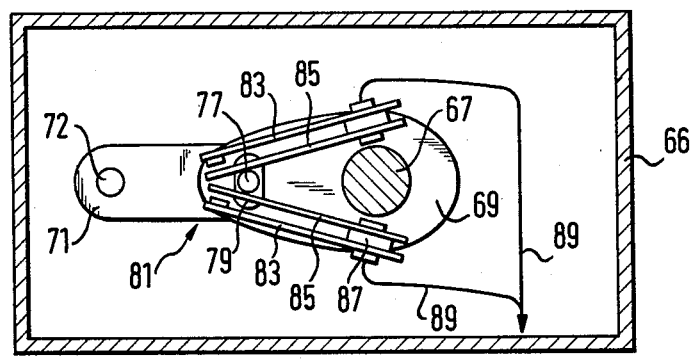
FIG. 4 illustrates internal elements of a corresponding gear shifting mechanism in side-elevational section.
Figure 5:
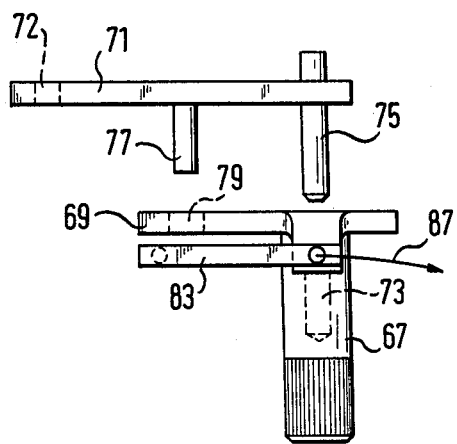
FIG. 5 is an exploded top plan view of elements in the device of FIG. 4.

The arm 71 projects radially beyond the arm 69, and its projecting portion is provided with an opening 72 normally engaged by a fastener which connects the arm 71, and thereby the shaft 67, and the gear shifting pedal on the shaft, not itself shown in FIGS. 4 and 5, to a transmission element whose movement causes the desired gear shift in a known manner. The arm 71 is turned by an end wall of the arm 69 in the slot 79 abutting against the pin 77. Shortly before the movement of the shaft 67 is transmitted to the arm 71 and thereby to the transmission element referred to above, one of the contact pads 81 is engaged by the associated leaf spring 87 which is deflected by the pin 77. Leads 89 then either ground the ignition circuit by means of the device shown in FIG. 1 or interrupt the ignition current in the manner described with reference to FIG. 2.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the appended claims.

What is claimed is:

1. Device to facilitate a fast change of gears in motorcycles, comprising:
   (a) an internal-combustion engine externally ignitable by means of an ignition system;
   (b) a variable speed transmission coupled to the internal-combustion engine, a shifting device having a shifting lever and a shifting shaft, the transmission having gears that are changeable by the shifting lever of the gear shifting device, said lever being actuable by a driver of the motorcycle;
   (c) two gear shifting members having a common rotational axis and being rotatable relative to each other around the common rotational axis, said members forming a line of force transfer from the shifting lever of the transmission, a pair of limit stops, at least one of said gear shifting members having the rotational angle of relative movement limited relative to the other by said stops, a shifting shaft, one of the gear shifting members being located closer to the transmission than the other and being non-rotatably mounted on the shifting shaft of the gear shifting device transverse to the axis of rotation of the shaft;
   (d) a contactor on one of the members actuable during relative rotation of the gear shifting members; and
   (e) a timing circuit actuable by activation of the contactor and which turns off when the ignition system is tripped and, after the termination of a delay of a predetermined duration, again turns on.

2. In apparatus as set forth in claim 1, said inactivating means including means for short-circuiting said ignition circuit.

3. In apparatus as set forth in claim 1, said timing means including a contact conductively connected to said ignition circuit, and electromagnetic actuator operating said contact when energized, and a switch in the energizing circuit of said actuator operatively connected to said speed-shifting member for energizing said actuator in response to said operation of the speed-shifting member.

4. In apparatus as set forth in claim 3, a source of direct current, a capacitor, said actuator including an induction coil, said capacitor, said switch, and said coil being series-connected to said source of direct current, and a bleeder resistor connecting said switch to said source of direct current and by-passing said capacitor.

5. In apparatus as set forth in claim 1, said ignition circuit including a monostable multivibrator as a source of said ignition current, said monostable multivibrator including a trigger input terminal, and said timing circuit including a switch conductively connected to said trigger input terminal.

6. In apparatus as set forth in claim 1, a transmission casing, said variable-speed transmission and said motion transmitting members being received in said casing.

7. In apparatus as set forth in claim 1, said contactor including two normally-open switches, said switches being closed by relative angular movement of said members toward the shifting position in respective directions.

8. In apparatus as set forth in claim 1, said delay being not substantially greater than 0.2 seconds.

9. In apparatus for supplying motive power to a vehicle, the apparatus including an internal combustion engine, an ignition circuit for supplying ignition current to said engine, a variable-speed transmission coupled to said engine, and a speed shifting member operatively connected to said transmission for changing the transmission ratio thereof, the improvement which comprises:
   (a) inactivating means for inactivating said ignition circuit in response to operation of said speed-shifting member; and
   (b) timing means for again activating said ignition circuit with a predetermined delay after said inactivating;
   a manually operable speed shifting element, and motion transmitting means operatively connecting said element to said speed shifting member, said motion transmitting means including first and second motion transmitting members connected for relative movement in response to manual operation of said speed shifting element, and said inactivating means including normally open switch means closed in response to said relative movement; said motion transmitting means further including a shaft having an axis, said first motion transmitting members being secured on said shaft against angular movement, the second motion transmitting member being angularly movable on said shaft, and abutment means limiting angular movement of said second member relative to said first motion transmitting member.

10. In apparatus as set forth in claim 9, said switch means including a fixed contact member and a resiliently movable contact member on one of said motion transmitting members, and a contact engaging element on the other member engaging said movable contact member during said angular movement of said second member for closing said switch means.

11. In apparatus as set forth in claim 9, a transmission casing, said motion transmitting means further including a shaft projecting from said casing, said motion transmitting members being fastened to said shaft and to said element respectively and connected to each other for relative angular movement.

12. In apparatus as set forth in claim 11, yieldably resilient means biasing said motion transmitting members toward an inoperative relative position, said switch means being mounted on one of said members and being closed in response to relative angular movement of said members away from said inoperative position.

* * * * *